UNITED STATES PATENT OFFICE.

JACOB FRANKLIN DYMOND, OF UNIONTOWN, PENNSYLVANIA.

CARBON FUEL.

1,106,289. Specification of Letters Patent. Patented Aug. 4, 1914.

No Drawing. Application filed December 30, 1912. Serial No. 739,391.

*To all whom it may concern:*

Be it known that I, JACOB F. DYMOND, a citizen of the United States, residing at Uniontown, in the county of Fayette and State of Pennsylvania, have invented certain new and useful Improvements in Carbon Fuel; and I do hereby declare the following to be a full, clear, and exact description of the invention, such as will enable others skilled in the art to which it appertains to make and use the same.

This invention relates to new and useful improvements in carbon fuel and the object in view is to produce a simple and efficient device of this nature, affording an instantaneous lighting and heating carbon.

The invention comprises a composition embodying various ingredients and compounded in various proportions.

In the preparation of the composition from which the carbon sticks or briquets are made, I employ preferably, two hundred parts charcoal to ten parts each of strontia nitrate and barium nitrate to five parts each of lead nitrate, potassium nitrate and potassium chlorate. The ingredients thus compounded are formed into sticks or briquets of convenient size for use in heaters of different kinds.

A carbon fuel made in accordance with my invention will light instantaneously and continue to burn with but little air, thus serving to retain heat.

By the provision of a stick or briquet of carbon made in accordance with my invention a convenient means is afforded which may be easily and quickly applied to heaters and which may be readily ignited by a match and form a continuous light and means of generating heat.

What I claim to be new is:—

A carbon fuel made up of the following ingredients and in the proportions set forth: charcoal two hundred parts, ten parts each of barium and strontia nitrate, to five parts each of lead nitrate, potassium nitrate and potassium chlorate and formed into suitable sticks or briquets.

In testimony whereof I hereunto affix my signature in the presence of two witnesses.

JACOB FRANKLIN DYMOND.

Witnesses:
GEO. W. SEMANS,
E. D. FULTON.

Copies of this patent may be obtained for five cents each, by addressing the "Commissioner of Patents, Washington, D. C."